July 8, 1958 H. L. BROWN 2,841,987
GYROSCOPIC APPARATUS
Filed March 14, 1957
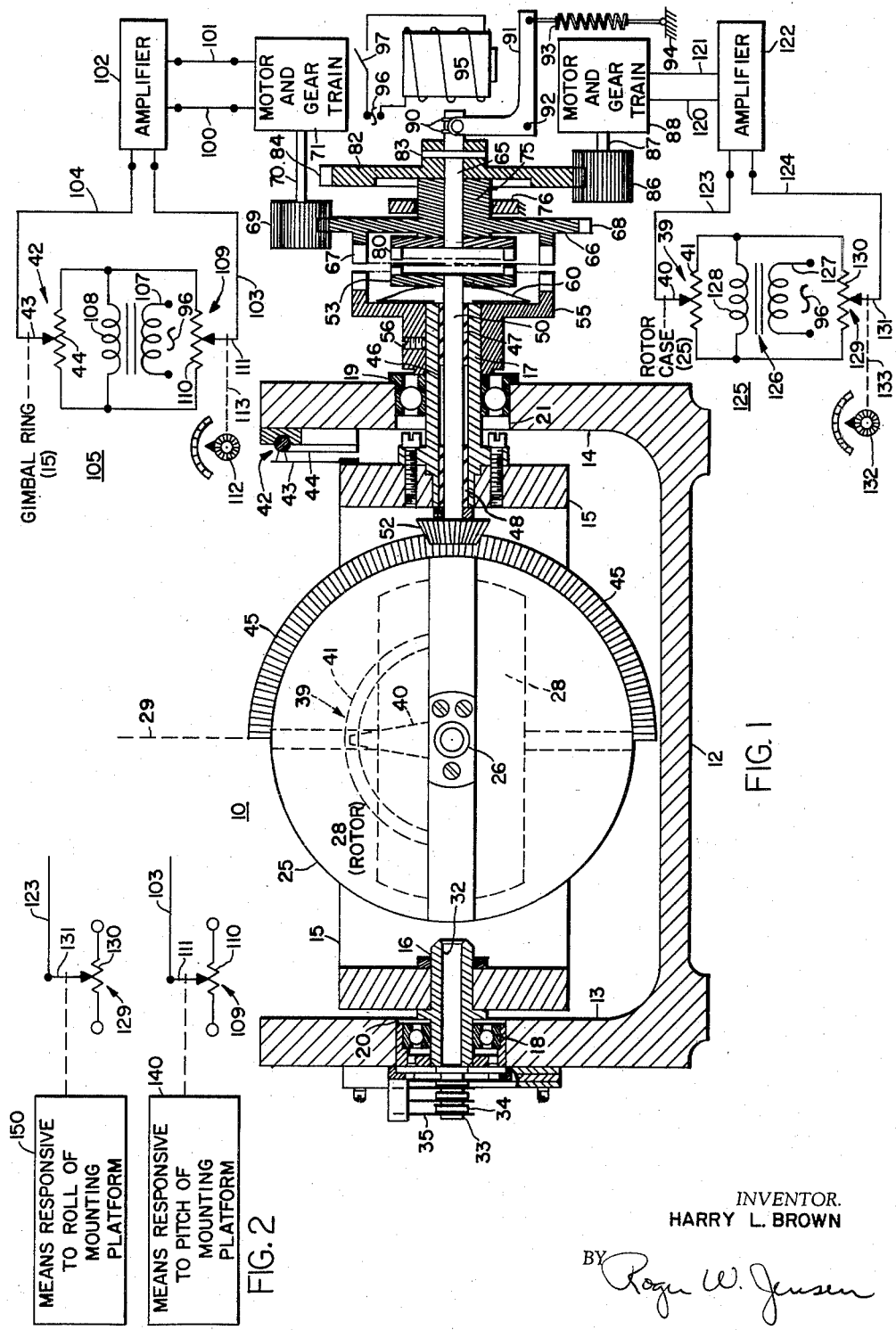
INVENTOR.
HARRY L. BROWN
BY Roger W. Jensen
ATTORNEY

2,841,987

GYROSCOPIC APPARATUS

Harry L. Brown, St. Paul, Minn., assignor to Minneapolis-Honeywell Regulator Company, Minneapolis, Minn., a corporation of Delaware Application March 14, 1957, Serial No. 646,158

17 Claims. (Cl. 74—5.1)

This invention pertains to apparatus for caging gyroscopes such as artificial horizons, gyro verticals, directional gyroscopes, etc. More specifically the present invention is concerned with a caging system for a gyroscope having a spin axis and means supporting the rotor for displacement about two mutually perpendicular axes wherein a means is provided that permits adjustably caging the spin axis to any desired angular orientation or attitude relative to a base member or other reference.

Many prior art caging mechanisms are known. Some of these always cage or return the gyro spin axis to the same attitude relative to the base. Others always cage or return the gyroscope to the same attitude relative to one of its displacement axes and adjustably cage the gyroscope about the other of its displacement axes. However, as far as I know, no prior art two degree of freedom gyroscope has been provided wherein the gyroscope may be adjustably caged about both of its displacement axes as has been provided in the present invention.

The present invention has numerous applications, one of which is the use as a sensing element in a control system for a dirigible craft. The gyroscope is mounted within the craft and the craft is adapted to be launched from a launching support. The angle at which the craft is mounted relative to the launching support may vary considerably according to various factors, one being the distance to be traveled. In addition, the launching support itself may be subject to movement, both about its longitudinal or roll axis and its transverse or pitch axis. An example of this would be a launching support mounted aboard a ship rolling and pitching in the ocean. Therefore, one aspect of the invention is to provide a means of caging the gyroscope to any desired attitude relative to two displacement axes in accordance to the spin axis attitude desired for a given control problem and then to uncage the gyroscope at the time of launching the craft in the desired attitude, the gyro during flight maintaining its position in inertial space due to its inherent spatial rigidity. Another aspect of the invention is to cage the gyroscope to a desired attitude relative to two displacement axes and to maintain the desired attitude relative to inertial space automatically regardless of the motion of the mounting means by having means responsive to movement of the mounting means controlling the caging apparatus.

It is an object of this invention therefore, to provide an improved gyroscope caging mechanism.

Another object of the invention is to provide an automatic caging mechanism for a gyroscope adapted to be mounted on a dirigible craft.

These and other objects will become more apparent from a reading of the following specification and appended claims, in conjunction with the accompanying drawing in which:

Figure 1 depicts a gyroscope comprising the present invention; and

Figure 2 shows an alternate arrangement for controlling the caging motors included in the apparatus shown in Figure 1.

Referring to Figure 1, numeral 10 depicts a two degree of freedom gyroscope comprising in part a base member 12 having upstanding portions 13 and 14 at opposite ends thereof and extending parallel to one another in the same direction from base 12. Base member 12 is adapted to be mounted by suitable means to a mounting platform such as a dirigible craft, not shown.

A gimbal ring 15 is rotatably supported by base member 12 and end members 13 and 14 thereof. The mounting means for gimbal 15 includes a pair of gudgeon pins 16 and 17 fastened by suitable means in opposite ends of gimbal ring 15 and having portions extending through the inner races of a pair of bearings 18 and 19 the outer races of which are secured by suitable means in apertures 20 and 21 provided in end portions 13 and 14 respectively of base member 12. Bearings 18 and 19 thus support gimbal ring 15 for full freedom of rotation relative to base member 12.

A rotor case 25 is rotatably supported by gimbal ring 15 for rotation relative to gimbal ring 15 about an axis at right angles to the axis defined by bearings 18 and 19. The means that journal rotor case 25 relative to gimbal ring 15 include a pair of bearing pins 26 (only one of which is shown in Figure 1). Suitable antifriction bearing means (not shown) mounted in gimbal ring 15 complete the means supporting rotor case 25 relative to gimbal ring 15.

A gyro spin rotor 28 is shown by dotted lines to be positioned within rotor case 25 and is supported by means not shown for rotation about a spin axis 29. Means not shown are provided for causing rotor 28 to spin about said spin axis 29. It will be noted that spin axis 29 is at right angles to the axis defined by bearing means 26, this latter axis also being identified as the first displacement axis. The axis defined by bearings 18 and 19 for supporting gimbal ring 15 for rotation relative to base 12 may be identified as the second displacement axis. Spin axis 29 is always perpendicular to the axis defined by bearing means 26 and the first displacement axis is always perpendicular to the second displacement axis. However, due to the fact that the rotor case 25 may be rotated about the first displacement axis the spin axis 29 is not always perpendicular to the second displacement axis although it is shown in that position in Figure 1.

Gudgeon pin 16 is provided with a hollow bore 32 through which may extend a plurality of flexible leads (not shown) for energizing the spin motor which drives rotor 28 as well as for energizing other auxiliary apparatus such as torquing means or other erection apparatus (not shown), or displacement pick-offs. The outer extremity of gudgeon pin 16 has provided thereon a plurality of slip ring surfaces 33 separated from one another by insulative shoulders 34. A plurality of wiper members 35 are insulatively mounted on base member 12 for cooperation with slip ring surfaces 33.

A wiper or sliding contact member 40 of a potentiometer pickoff 39 is mounted on rotor case 25 to rotate therewith about the first displacement axis and cooperates with a resistance winding 41 mounted on gimbal ring 15. Potentiometer 39 is energized by suitable means so as to develop a signal as a function of relative rotation between rotor case 25 and gimbal ring 15 about the first displacement axis.

A wiper or sliding contact member 43 of a potentiometer pickoff 42 is mounted on gimbal ring 15 for rotation therewith about the second displacement axis relative to base 12 and cooperates with a resistance winding 44 mounted on end member 14 of base 12. Potentiometer 42 is energized by suitable means so as to develop a signal as a function of relative rotation between gimbal ring 15 and base 12.

A sector gear 45 is mounted on rotor case 25 for rotation therewith about the first displacement axis defined in part by bearing means 26 on rotor case 25.

Gudgeon pin 17 is provided with a hollow bore 46 extending therethrough and a first shaft 50 is mounted within bore 46 by a pair of bearing means 47 and 48 which permit both axial and rotative movement of the first shaft 50 relative to the gudgeon pin 17 and of course relative to base 12. The first shaft 50 thus may be rotated about the second displacement axis as well as being movable along said second displacement axis.

Shaft 50 has two ends thereon the inner of which terminates adjacent to gear sector 45 on rotor case 25. A beveled spur gear 52 is fastened by suitable means to the inner end of shaft 50 and as shown in Figure 1 is out of engagement with gear 45. A gear 53 having gear teeth on the axial face thereof is mounted on the other or outer end of shaft 50 and is fastened thereto by suitable means not shown.

A gear 55 having gear teeth on an axial face thereof is fastened by suitable means such as a set screw 56 to the portion of gudgeon pin 17 that extends out from end member 14 beyond the inner race of bearing 19. Since gear 55 is fastened to gudgeon pin 17 and since gudgeon pin 17 in turn is fastened to gimbal ring 15 it follows that rotative torques applied to gear 55 will be transmitted to gimbal ring 15.

Spring means 60 are positioned between gears 53 and 55 and tend to exert a biasing force on first shaft 50 so as to maintain bevel gear 52 away from the sector gear 45 on the rotor case 25.

A second shaft 65 having two ends is mounted coaxially with the first shaft 50. A gear 66 is mounted on the second shaft 65 for relative rotation therewith and has two sets of gear teeth thereon, one set of teeth 67 being axially arranged and of the same diameter as the axial gear teeth on gear 55. Gear 66 is normally positioned so that said teeth 67 are spaced slightly from the gear teeth on gear 55. A second set of teeth 68 on gear 66 are radially arranged and are adapted to be engaged by a pinion gear 69 secured to the end of a shaft 70 driven by a motor and gear train combination 71 to be described in more detail below.

A hub portion 75 of gear 66 is supported for both rotation and axial movement in a suitable bearing means 76 which in practice is fastened to base member 12 by suitable means not shown. Bearing means 76 thus supports gear 66 and hence supports the second shaft 65.

A gear 80 having axial teeth thereon of the same diameter and shape as the teeth on gear 53 is mounted on the inner end of the second shaft 65 and is normally positioned slightly spaced away from gear 53. Gear 80 is fastened by suitable means not shown to the second shaft 65 so as to rotate therewith.

Another gear 82 is secured to the second shaft 65 near the other end thereof by suitable means such as pin means 83 so as to rotate therewith and includes suitable radial teeth 84 which mesh with a pinion gear 86 mounted on the end of a shaft 87 of a motor and gear train unit 88 to be described in greater detail below. A collar 90 is provided on the other end of the second shaft 65 and cooperates with the follower end of an L-shaped lever 91 which is pivoted as at 92. A biasing spring 93 is fastened at one end to a suitable support 94 and is fastened at its other end to the other end of lever 91. Spring 93 tends to maintain lever 91 in the position shown in Figure 1. An electromagnet 95 has coil means thereon adapted to be connected to a suitable source of power 96 through a switch 97. When switch 97 is closed thus energizing the coil means, electromagnet 95 displaces lever member 91 from the position shown in Figure 1 and causes it to rotate counter-clockwise as shown in Figure 1 about pivot point 92 thus axially displacing second shaft 65 to the left as shown in Figure 1.

Motor and gear train unit 71 receives a controlling input through a pair of leads 100 and 101 from an amplifier 102 which may be of any suitable type to serve the intended purpose and which in turn receives a controlling signal from a pair of leads 103 and 104 which are connected to opposite sides of a network 105. Network 105 includes a transformer 106 having a primary winding 107 energized from a suitable source of power 96 and a secondary winding 108 having its ends connected to opposite ends of resistance portion 44 of the pickoff 42 between gimbal ring 15 and base member 12. Wiper member 43 of said pickoff 42 is connected through lead 104 to amplifier 102. The ends of secondary winding 108 of transformer 106 are also connected to opposite ends of a resistance member 110 of a potentiometer 109 which also has a wiper member 111 adapted to be moved relative to a resistance member 110 by a controlling means 112 which is connected to wiper 111 by suitable operating connection 113. Wiper 111 is electrically connected to amplifier 102 by lead 103.

Motor and gear train unit 88 receive a controlling input signal through a pair of leads 120 and 121 from an amplifier 122 which in turn receives a controlling signal through a pair of leads 123 and 124, which are connected to opposite ends of a network 125. Network 125 includes a transformer 126 (which may if desired be part of transformer 106) comprising a transformer primary winding 127 energized from a suitable source of power 96 and a secondary winding 128 having opposite ends thereof connected to opposite ends of resistance winding 41 which is part of the pickoff 39 which senses relative rotation between gyro rotor case 25 and gimbal ring 15. The wiper 40 of pickoff 39 mounted on gyro rotor case 25 which cooperates with resistance winding 41 is electrically connected to amplifier 122 through the connection lead 123. The two ends of secondary winding 128 of transformer 126 are also connected to opposite ends of the resistance portion 130 of a potentiometer 129 which also includes a wiper member 131 which is electrically connected to amplifier 122 through a lead 124 and which is mechanically connected to a suitable controlling means such as a control knob 132 through a suitable mechanical connection 133.

Figure 2 shows an alternate arrangement for controlling motor and gear train units 71 and 88. In Figure 2 are shown the potentiometers 129 and 109 out of control networks 125 and 105 respectively of Figure 1. Networks 105 and 125 are exactly the same in Figure 2 as in Figure 1 except for the means that drive the wipers 111 and 131. In Figure 1 wipers 111 and 131 are operated through driving connections 113 and 133 by manually adjustable means 112 and 132. In Figure 2 wipers 111 and 131 are operated respectively as controlled objects of control means 140 and 150. Control means 140 generally depicts any apparatus which can produce an output mechanical signal which is a function of pitch of the means upon which gyro 10 is mounted and control means 150 depicts any means which is capable of producing an output mechanical signal as a function of roll of the mounting means. This is for the case of when gyro 10 is mounted with base 12 mounted on a craft or other object with the first displacement axis defined in part by bearing means 26 aligned with the roll axis of the craft upon which gyro 10 is mounted and with the second displacement axis defined by bearings 18 and 19 in line with the pitch or transverse axis of the mounting means.

*Operation*

When gyro 10 is mounted with base 12 attached to the device to be controlled as indicated above, that is with the first displacement axis of gyro 10 being in line with the longitudinal or roll axis of the craft and the second displacement axis of the gyro being in line with the transverse or pitch axis of the craft, then pickoff 39 including wiper member 40 on rotor case 25 and resistance member 41 on gimbal ring 15 senses rotation of the means mounting gyro 10 about its roll axis and the pickoff 42 including wiper member 43 on gimbal ring 15 and resistance member 44 on end portion 14 of base 12 senses relative movement of the means mounting gyro 10 about the pitch axis thereof. These control signals may be used for stabilizing the flight of the means mounting the gyro by controlling servomotor means not shown or may be used for any other desired control function.

When it is desired to cage gyro 10 electromagnet 95 is energized by the closing of switch 97. This causes L-shaped lever member 91 to rotate counter-clockwise as shown in Figure 1 about pivot point 92 and moves the second shaft 65 axially towards the left as shown in Figure 1. Gear 80 on the inner end of the second shaft 65 moves with shaft 65 and first engages gear 53 mounted on the outer end of the first shaft 50 and causes the first shaft 50 to be moved axially toward the left as shown in Figure 1, spring means 60 permitting this movement. The axial movement of the first shaft 50 under the driving force of electromagnet 95 causes bevel gear 52 to be moved into engagement with gear 45 mounted on the rotor case 25. As gear 52 is engaging gear 45 at the same time the set of axial gear teeth 67 on the gear 66 rotatably mounted on the second shaft 65 are moved into engagement with the teeth on the gear 55 attached to gudgeon pin 17, which in turn is attached to gimbal ring 15. The pinion gears 69 and 86 driven by motor and gear train units 71 and 88 respectively have sufficient axial length so as to permit a limited amount of axial movement of the second shaft 65 without being disengaged from the gears 66 and 82 which they drive.

Energization of electromagnet 95 therefore serves to cause gear 80 to engage gear 53, to cause the teeth 67 on gear 66 to engage gear 55, and causes the gear 52 on the inner end of the first shaft 50 to engage gear 45 on the rotor case 25. This in effect locks the gyro 10 so that the spin axis 29 thereof is fixed relative to the base 12 and spatial rigidity of the gyro is destroyed. Then motor and gear train units 71 and 88 may be selectively energized from their controlling networks 105 and 125 respectively so as to cause rotation of rotor case 25 relative to gimbal ring 15 and so as to cause relative rotation between gimbal ring 15 and base 12. For example, rotation of output shaft 70 of motor and gear train unit 71 is transmitted by pinion gear 69 to the gear 66 rotatably mounted on the second shaft 65. The axial teeth 67 on gear 66 transmit the torque to gear 55 attached to gudgeon pin 16 which in turn is attached to gimbal ring 15. Thus gimbal ring 15 is caused to rotate relative to base 12 about the second displacement axis, by rotation of motor and gear train unit 71. Also, rotation of motor and gear train unit 88 is transmitted through its output shaft 87 to the pinion gear 86 attached to the end thereof and from pinion gear 86 to the gear 82 fixed near the other end of the second shaft 65. Shaft 65 is thus caused to rotate which rotative torque is transmitted by gear 80 fastened on the inner end thereof to gear 53 which is mounted on the outer end of the first shaft 50. The first shaft 50 is thus caused to rotate and the rotative torque is transmitted to the gear 45 mounted on the rotor case 25 through the beveled pinion gear 52 mounted on the inner end of the first shaft 50. Thus rotation of the motor and gear train unit 88 causes relative rotation between the rotor case 25 and the gimbal ring 15 about the first displacement axis.

The amount of rotation produced by the motor and gear train units 71 and 88 is a function of the displacement of the wipers 111 and 131 respectively. Thus the rebalance network 105 which controls motor and gear train unit 71 would have its wiper 111 displaced by control knob 112 as a function of the desired change in pitch attitude of the spin axis 29 relative to the base 12. Thus, control knob 112 would be rotated so as to displace wiper member 111 away from its position as shown in Figure 1. This would unbalance the network and apply a controlling signal to amplifier 102 which in turn would energize motor and gear train unit 71 so as to drive gimbal ring 15 relative to base 12. This rotation between gimbal ring 15 and base 12 would be sensed by the pick-off 42 and wiper 43 would be caused to move relative to the resistance member 44 thereof. The control circuit is designed so that gimbal ring 15 would be driven relative to base 12 in such a direction so that the movement of wiper 43 relative to resistance portion 44 would serve to wipe out or rebalance the signal originally produced by movement of the control knob 112.

In the same manner when it is desired to change the roll attitude of the spin axis 29 relative to the base 12 then control knob 132 would be rotated so as to cause movement between wiper 131 and resistance member 130 of the potentiometer 129, which forms a part of the control network 125 for the motor and gear train unit 88. The relative movement between wiper 131 and the resistance member 130 causes a controlling signal to be applied to amplifier 122 which in turn causes motor and gear train unit 88 to rotate driving through the above described linkage the rotor case 25 relative to the gimbal ring 15 about the first displacement axis defined in part by bearing means 26 on the rotor case 25. Said rotation is sensed by the pick-off 39 causing relative movement between the wiper 40 and the resistance member 41. The design is such that motor and gear train unit 88 drives rotor case 25 relative to gimbal ring 15 in such a way that the rebalance signal developed by potentiometer 39 tends to wipe out or rebalance the signal originally produced by the pick-off or control potentiometer 129. It will be appreciated that the potentiometers 109 and 129 can be located a considerable distance away from the gyroscope 10 and thus control knobs 112 and 132 may be used by an operator remotely located from the gyroscope 10 and the device in which it is mounted for remote control thereof of the attitude of the spin axis 29 relative to the base 12 of the gyro and hence relative to the device upon which the gyro is mounted. By proper control of the knobs 112 and 132 the spin axis 29 may be moved to any one of an infinite number of attitudes relative to the base 12. As long as the electromagnet 95 is energized the motor and gear train units 71 and 88 are coupled to the gimbal 15 and rotor case 25 respectively and are thus capable of responding to control signals so as to change the gyro spin axis about either of its first or second displacement axes. When the spin axis is at the desired attitude then electromagnet 95 is de-energized and the biasing return spring 93 causes the L-shaped lever 91 to rotate clockwise as shown in Figure 1 about its pivot point 92 thus disengaging gear 80 from gear 53 and disengaging the axial gear teeth 67 on gear 66 from gear 55. The spring means 60 serve to disengage gear 52 from the sector gear 45 on the rotor case 25 and the gyro is unrestrained and serves as an inertial reference. If it is desired to subsequently change the attitude of the spin axis 29 relative to the base 12 or if it is merely desired to cage gyro 10 then the above sequence of operation will be repeated beginning with energization of electromagnet 95 so as to destroy the spatial rigidity of the gyroscope 10.

The apparatus shown in Figure 2 for developing control signals in the control networks 105 and 125 would function much the same as the apparatus described above. The only difference would be that the means controlling the wipers 111 and 131 instead of being manual control knobs 112 and 132 would be means 140 and 150 respectively which respond to pitch and roll of the mounting means. Thus the pitch responsive means 140 are connected to wiper 111 which would provide a controlling signal for network 105 so as to energize motor and gear train unit 71 and so as to drive gimbal ring 15 relative to base 12. The pickoff 42 as before would sense the rotation between gimbal ring 15 and base 12 and would develop a rebalance signal in network 105 which would balance out or cancel out the control signal from the pitch responsive means 140. Thus, means are provided for constantly and automatically maintaining the displacement of the spin axis 29 about the pitch axis as a function of the pitch of the platform upon which the gyro 10 is mounted. Also the roll responsive means 150 would drive wiper 131 so as to provide a controlling signal for the network 125 which controls the motor and gear train unit 80 so as to cause rotation of rotor case 25 about the first displacement axis relative to the gimbal ring 15. As before, such rotation is sensed by the pickoff 39 so as to apply a feedback or rebalance signal into the network 125 which cancels out or nullifies the original signal from the roll responsive means 150. Thus a means is provided for automatically maintaining the attitude of the gyro spin axis 29 about the roll axis of the platform upon which the gyro 10 is mounted.

In the above description of the apparatus one possible mounting was suggested as a means of explaining operation, namely, with the first displacement axis of the gyro being aligned with the roll axis of the mounting means and with the second displacement axis of the gyro aligned with the pitch axis of the mounting means. Obviously, this has been done merely for illustrative purposes and the scope of the invention should not be limited thereto as the invention may be used on gyros having a wide variety of applications.

Therefore, while I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. A variable angle caging apparatus for a gyroscope having a rotor adapted to rotate about a spin axis and a pair of members mounting said rotor for rotation about a pair of mutually perpendicular axes, one of said axes being perpendicular to said spin axis, said caging apparatus comprising: first coupling means on one of said pair of members; second coupling means on the other of said pair of members; first motor means having rotatable means; second motor means having rotatable means; means for simultaneously coupling said rotatable means of said first motor means to said first coupling means and coupling said rotatable means of said second motor means to said second coupling means; means controlling the energization of said first and said second motor means so as to control the rotation of said rotatable means, said coupling of said rotatable means to said first and said second coupling means destroying the spatial rigidity of said rotor and permitting said motor means to rotate said rotor about said pair of mutually perpendicular axes simultaneously to change the attitude of said spin axis; and means for simultaneously decoupling said rotatable means of said first and second motor means from said first and second coupling means.

2. A variable angle caging apparatus for a gyroscope having a rotor adapted to rotate about a spin axis and a pair of members supporting said rotor for rotation about a pair of mutually perpendicular axes, one of said axes being perpendicular to said spin axis, said caging apparatus comprising: first coupling means on one of said pair of supporting members; second coupling means on the other of said pair of supporting members; first rotatable means; second rotatable means; means for simultaneously coupling said first rotatable means to said first coupling means and coupling said second rotatable means to said second coupling means; means controlling the rotation of said rotatable means, said coupling of said rotatable means to said first and said second coupling means destroying the spatial rigidity of said rotor and permitting said rotatable means to rotate said supporting members about said pair of mutually perpendicular axes simultaneously to change the attitude of said spin axis; and means for simultaneously decoupling said rotatable means from said first and second coupling means.

3. A variable angle caging apparatus for a gyroscope having a rotor adapted to rotate about a spin axis and means supporting said rotor for rotation about a pair of mutually perpendicular axes, one of said axes being perpendicular to said spin axis, said caging apparatus comprising: first coupling means on said supporting means for transferring a rotative torque tending to rotate said rotor about one of said pair of axes; second coupling means on said supporting means for transferring rotative torques tending to rotate said rotor about the other of said pair of axes; first rotatable means; second rotatable means; means for simultaneously coupling said first rotatable means to said first coupling means and coupling said second rotatable means to said second coupling means; means selectively controlling the rotation of said first and said second rotatable means, said coupling of said rotatable means to said first and said second coupling means destroying the spatial rigidity of said rotor and permitting said rotatable means to rotate said rotor about said pair of mutually perpendicular axes simultaneously to change the attitude of said spin axis; and means for simultaneously decoupling said rotatable means from said first and second coupling means.

4. A variable angle caging apparatus for a gyroscope having a rotor adapted to rotate about a spin axis and a pair of members mounting said rotor for rotation about a pair of mutually perpendicular axes, one of said axes being perpendicular to said spin axis, said caging apparatus comprising: first coupling means on one of said pair of members; second coupling means on the other of said pair of members; first rotatable means; second rotatable means; means for simultaneously coupling said first rotatable means to said first coupling means and coupling said second rotatable means to said second coupling means; and means controlling the rotation of said rotatable means, said coupling of said rotatable means to said first and said second coupling means destroying the spatial rigidity of said rotor and permitting said rotatable means to rotate said rotor about said pair of mutually perpendicular axes simultaneously to change the attitude of said spin axis.

5. A variable angle caging apparatus for a gyroscope having a rotor adapted to rotate about a spin axis and a pair of members mounting said rotor for rotation about a pair of mutually perpendicular axes, one of said axes being perpendicular to said spin axis, said caging apparatus comprising: first coupling means to one of said pair of members; second coupling means on the other of said pair of members; first motor means having rotatable means; second motor means having rotatable means; means for simultaneously coupling said rotatable means of said first motor means to said first coupling means and coupling said rotatable means of said second motor means to said second coupling means; means controlling the energization of said first and said second motor means so as to control the rotation of said rotatable means, said coupling of said rotatable means to said first and said second coupling means destroying the spatial rigidity of said rotor and permitting said motor means to rotate said rotor about said pair of mutually perpendicular axes simultaneously to change the attitude of said spin axis; and means for simultaneously decoupling said rotatable means of said first and second motor means from said first and second coupling means; said motor control means comprising a first network connected to said first motor means and having an adjustable control element and a follow-up element connected to said one of said members and a second network connected to said second motor means and having an adjustable control element and a follow-up element connected to said other of said members.

6. A variable angle caging apparatus for a gyroscope having a rotor adapted to rotate about a spin axis and a pair of members mounting said rotor for rotation about a pair of mutually perpendicular axes, one of said axes being perpendicular to said spin axis, said caging apparatus comprising: first coupling means on one of said pair of members; second coupling means on the other of said pair of members; first rotatable means; second rotatable means; means for simultaneously coupling said first rotatable means to said first coupling means and coupling said second rotatable means to said second coupling means; means controlling the rotation of said rotatable means, said coupling of said rotatable means to said first and said second coupling means destroying the spatial rigidity of said rotor and permitting said rotatable means to rotate said rotor about said pair of mutually perpendicular axes simultaneously to change the attitude of said spin axis; and means for simultaneously decoupling said rotatable means from said first and second coupling means; said control means for said rotatable means comprising a first network connected to said first rotatable means and having an adjustable control element and a follow-up element connected to said one of said pair of members and a second network connected to said second rotatable means and having an adjustable control element and a follow-up element connected to said other of said pair of members.

7. A variable angle caging apparatus for a gyroscope having a rotor adapted to rotate about a spin axis and means mounting said rotor for rotation about a pair of mutually perpendicular axes, one of said axes being perpendicular to said spin axis, said caging apparatus comprising: first coupling means on said supporting means for transferring a rotative torque tending to rotate said rotor about one of said pair of axes; second coupling means on said supporting means for transferring rotative torques tending to rotate said rotor about the other of said pair of axes; first rotatable means; second rotatable means; means for simultaneously coupling said first rotatable means to said first coupling means and coupling said second rotatable means to said second coupling means; means selectively controlling the rotation of said first and said second rotatable means, said coupling of said rotatable means to said first and said second coupling means destroying the spatial rigidity of said rotor and permitting said rotatable means to rotate said rotor about said pair of mutually perpendicular axes simultaneously to change the attitude of said spin axis; and means for simultaneously decoupling said rotatable means from said first and second coupling means; said motor control means comprising a first network connected to said first rotatable means and having an adjustable control element and a follow-up element connected to said rotor mounting means and a second network connected to said second rotatable means and having an adjustable control element and a follow-up element connected to said rotor mounting means.

8. A variable angle caging apparatus for a gyroscope having a rotor adapted to rotate about a spin axis and means mounting said rotor for rotation about a pair of mutually perpendicular axes, one of said axes being perpendicular to said spin axis, said caging apparatus comprising: first coupling means on said supporting means; second coupling means on said supporting means; first rotatable means; second rotatable means; means for simultaneously coupling said first rotatable means to said first coupling means and coupling said second rotatable means to said second coupling means; and means controlling the rotation of said first and second rotatable means, said coupling of said rotatable means to said first and said second coupling means destroying the spatial rigidity of said rotor and permitting said rotatable means to rotate said rotor about said pair of mutually perpendicular axes simultaneously to change the attitude of said spin axis; said motor control means comprising a first network connected to said first rotatable means and having an adjustable control element and a follow-up element connected to said supporting means and a second network connected to said second rotatable means and having an adjustable cotrol element and a follow-up element connected to said supporting means.

9. A variable angle caging apparatus for a gyroscope having a rotor with a spin axis and means supporting said rotor for rotation about a pair of mutually perpendicular axes, one of said axes being perpendicular to said spin axis comprising: coupling means on said supporting means; motor means including rotary means; means including said coupling means for coupling and decoupling said rotary means of said motor means to said supporting means; and means for controlling the energization of said motor means so as to control the amount of rotation of said rotary means, said coupling of said rotary means of said motor means to said supporting means destroying the spatial rigidity of said rotor and permitting said rotary means to rotate said rotor about said pair of mutually perpendicular axes simultaneously to change the attitude of said spin axis.

10. A caging apparatus for a gyroscope rotor having a spin axis and a pair of mutually perpendicular supporting axes, comprising means for simultaneously holding said rotor in whatever position it may be in with respect to both of said supporting axes, motor means, and means including said holding means and said motor means for simultaneously rotating said rotor about said supporting axes.

11. A caging apparatus for a gyroscope rotor having a spin axis and a pair of mutually perpendicular supporting axes, comprising means for locking said rotor with respect to both of said supporting axes simultaneously, motor means, means connecting said motor means to said locking means, and means for energizing said motor means, said motor means when energized rotating said rotor about both of said displacement axes simultaneously.

12. A variable angle caging apparatus for a gyroscope having a rotor adapted to rotate about a spin axis, a pair of mutually perpendicular displacement axes and a base member, comprising: first controllable rotatable means; second controllable rotatable means; third controllable means which when controlled simultaneously connects said first and said second controllable rotatable means to said rotor, said simultaneous connection destroying the spatial rigidity of said rotor; first pickoff means for sensing displacement of said rotor about one of said displacement axes; second pickoff means for sensing displacement of said rotor about the other of said pair of displacement axes; mounting means; means mounting said base member on said mounting means; third pickoff means for sensing displacement of said mounting means about a first axis of said mounting means; fourth pickoff means for sensing displacement of said mounting means about a second axis of said mounting means; a first network for controlling said first controllable rotatable means comprising said first pickoff means, said third pickoff means, means energizing said first and third pickoff means, and means connecting said first network to said first controllable rotatable means; a second network for controlling said second controllable rotatable means comprising said second pickoff means, said fourth pickoff means, means energizing said second and fourth pickoff means, and means connecting said second network to said second controllable rotatable means; and means for controlling said third controllable means, said first and second controllable rotatable means when connected to said rotor causing displacement of said rotor about said pair of displacement axes, the amount of said displacement caused by said first and second controllable means being a function of the displacement of said mounting means about said first and second axes of said mounting means as sensed by said third and fourth pickoff means in said first and second networks controlling said first and second controllable rotatable means.

13. A variable angle caging apparatus for a gyroscope having a rotor adapted to rotate about a spin axis, a pair of mutually perpendicular supporting axes and a base member, comprising: first controllable rotatable means; second controllable rotatable means; third controllable means which when controlled simultaneously connects said first and said second controllable rotatable means to said rotor, said simultaneous connection destroying the spatial rigidity of said rotor; first pickoff means for sensing movement of said rotor about one of said supporting axes; second pickoff means for sensing movement of said rotor about the other of said pair of supporting axes; supporting means; means mounting said base member on said supporting means; third pickoff means for sensing movement of said supporting means about a first axis of said supporting means; fourth pickoff means for sensing movement of said supporting means about a second axis of said supporting means; a first network for controlling said first controllable rotatable means comprising said first pickoff means, said third pickoff means, means energizing said first and third pickoff means, and means connecting said first network to said first controllable rotatable means; a second network for controlling said second controllable rotatable means comprising said second pickoff means, said fourth pickoff means, means energizing said second and fourth pickoff means, and means connecting said second network to said second controllable rotatable means; and means for controlling said third controllable means, said first and second controllable rotatable means when connected to said rotor causing movement of said rotor about said pair of supporting axes, the amount of said movement caused by said first and second controllable means being a function of the movement of said supporting means about said first and second axes of said supporting means as sensed by said third and fourth pickoff means in said first and second networks controlling said first and second controllable rotatable means.

14. A variable angle caging apparatus for a gyroscope having a rotor adapted to rotate about a spin axis, a pair of mutually perpendicular supporting axes and a base member, comprising: first controllable rotatable means; second controllable rotatable means; third controllable means for connecting said first and said second controllable rotatable means to said rotor, said connection destroying the spatial rigidity of said rotor; first signal producing means for sensing movement of said rotor about one of said supporting axes; second signal producing means for sensing movement of said rotor about the other of said pair of supporting axes; third signal producing means; fourth signal producing means; means controlling said third and fourth signal producing means; a first network for controlling said first controllable rotatable means comprising said first signal producing means, said third signal producing means, and means connecting said first network to said first controllable rotatable means; a second network for controlling said second controllable rotatable means comprising said second signal producing means, said fourth signal producing means, and means connecting said second network to said second controllable rotatable means; and means for controlling said third controllable means, said first and second controllable rotatable means when connected to said rotor causing movement of said rotor about said pair of supporting axes, the amount of said movement caused by said first and second controllable rotatable means being a function of signals from said third and said fourth signal producing means.

15. A variable angle caging apparatus for a gyroscope having a rotor adapted to rotate about a spin axis, a pair of mutually perpendicular supporting axes and a base member, comprising: first controllable rotatable means; second controllable rotatable means; means for connecting said first and said second controllable rotatable means to said rotor, said connection destroying the spatial rigidity of said rotor; first signal producing means; second signal producing means; a first network for controlling said first controllable rotatable means comprising said first signal producing means, and means connecting said first network to said first controllable rotatable means; and a second network for controlling said second controllable rotatable means comprising said second signal producing means, and means connecting said second network to said second controllable rotatable means; said first and second controllable rotatable means when connected to said gyroscope causing movement of said rotor about said pair of supporting axes, the amount of said movement caused by said first and second controllable means being a function of signals from said first and second signal producing means.

16. A variable angle caging apparatus for gyroscopes comprising: a rotor having a spin axis; a gimbal ring; means rotatably mounting said rotor on said gimbal ring for rotation about a first displacement axis; a base; means rotatably mounting said gimbal ring on said base for rotation about a second displacement axis, said second displacement axis being normal to said first displacement axis; a sector gear connected to said rotor for rotation therewith about said first displacement axis; a first shaft having two ends; means rotatably and slidably mounting said first shaft in said means rotatably mounting said gimbal ring on said base coaxial with said second displacement axis so that said first shaft may be rotated about said second displacement axis and so that said shaft may be axially displaced along said second displacement axis, said mounting means for said shaft positioning one of said ends of said shaft adjacent to said sector gear connected to said rotor; a beveled pinion gear mounted on said one of said ends of said shaft for rotation therewith; first coupling means on the other end of said first shaft; second coupling means on said gimbal ring; a second shaft having two ends; third coupling means on one of said ends of said second shaft; means mounting said second shaft for rotation about a third axis and for axial movement along said third axis, said second shaft mounting means aligning said third axis and said second displacement axis and positioning said third coupling means on said one of said ends of said second shaft adjacent to and spaced from said first coupling means on said other end of said first shaft; fourth coupling means; means rotatably mounting said fourth coupling means for rotation relative to said second shaft and so that said fourth coupling means is adjacent to and spaced from said second coupling means; first motor means; means connecting said first motor means to said second shaft, said first motor means when energized displacing said second shaft axially along said third axis, causing engagement of said first coupling means by said third coupling means, causing engagement of said second coupling means by said fourth coupling means, causing said first shaft to be displaced axially along said second displacement axis, and causing engagement of said sector gear by said beveled pinion gear; second motor means; means connecting said second motor means to said third coupling means; third motor means, means connecting said third motor means to said fourth coupling means; and means controlling said first, second, and third motor means so as to position said rotor about said first displacement axis and so as to position said gimbal ring about said second displacement axis.

17. A variable angle caging apparatus for gyroscopes comprising: a rotor having a spin axis; a gimbal ring; means rotatably mounting said rotor on said gimbal ring for rotation about a first axis; a base; means rotatably mounting said gimbal ring on said base for rotation about a second axis, said second axis being normal to said first axis; gear means connected to said rotor for rotation therewith about said first axis; a first shaft having two ends; means rotatably and slidably mounting said first shaft in said gimbal mounting means coaxial with said second axis so that said first shaft may be rotated about said second axis and so that said first shaft may be axially displaced along said second axis, said mounting means for said shaft positioning one of said ends of said shaft adjacent to said gear means connected to said rotor; gear means mounted on said one of said ends of said shaft for rotation therewith; first coupling means on the other end of said first shaft; second coupling means connected to said gimbal ring; a second shaft having two ends; third coupling means on one of said ends of said second shaft; means mounting said second shaft for rotation about said second axis and for axial movement along said second axis, said second shaft mounting means positioning said third coupling means on said one of said ends of said second shaft adjacent to and spaced from said first coupling means on said other end of said first shaft; fourth coupling means; means rotatably mounting said fourth coupling means for rotation relative to said second shaft and so that said fourth coupling means is adjacent to and spaced from said second coupling means; first motor means; means connecting said first motor means to said second shaft, said first motor means when energized displacing said second shaft axially along said second axis, causing engagement of said first coupling means by said third coupling means, causing engagement of said second coupling means by said fourth coupling means, causing said first shaft to be displaced axially along said second displacement axis, and causing engagement of said sector gear by said beveled pinion gear; second motor means; means connecting said second motor means to said third coupling means; third motor means, means connecting said third motor means to said fourth coupling means; and means controlling said first, second, and third motor means so as to position said rotor about said first displacement axis and so as to position said gimbal ring about said second displacement axis.

References Cited in the file of this patent

UNITED STATES PATENTS 2,410,473    Weems _____ Nov. 5, 1946